United States Patent
Hehmeyer et al.

(10) Patent No.: US 9,912,579 B2
(45) Date of Patent: Mar. 6, 2018

(54) TECHNIQUES TO MANAGE PRESENCE INFORMATION BASED ON ROUTING RULES

(71) Applicant: MICROSOFT TECHNOLOGY LICENSING, LLC, Redmond, WA (US)

(72) Inventors: Alexander M Hehmeyer, Bellevue, WA (US); Venkateshaiah Setty, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 14/662,644

(22) Filed: Mar. 19, 2015

(65) Prior Publication Data

US 2015/0229559 A1 Aug. 13, 2015

Related U.S. Application Data

(63) Continuation of application No. 12/142,787, filed on Jun. 20, 2008, now Pat. No. 9,014,016.

(51) Int. Cl.
*G01R 31/08* (2006.01)
*H04J 1/16* (2006.01)
(Continued)

(52) U.S. Cl.
CPC .............. *H04L 45/14* (2013.01); *H04L 45/00* (2013.01); *H04L 45/124* (2013.01); *H04L 67/24* (2013.01)

(58) Field of Classification Search
CPC ....................................... H04L 67/24
See application file for complete search history.

(56) References Cited

U.S. PATENT DOCUMENTS 6,125,126 A   9/2000  Hallenstangl
6,308,216 B1  10/2001 Goldszmidt et al.
(Continued)

FOREIGN PATENT DOCUMENTS

WO    2005039061       4/2005
WO    2007113516      10/2007
WO    WO 2007113516 A1 * 10/2007 ............. H04L 67/24

OTHER PUBLICATIONS

Bertino et al., "UCS-Router: A Policy Engine for Enforcing Message Routing Rules in a Universal Communication System", Proceedings of the Third International Conference on Mobile Data Management (MDM.cndot.02), 2002, 8 pages.
(Continued)

*Primary Examiner* — Maharishi Khirodhar
(74) *Attorney, Agent, or Firm* — Schwegman Lundberg & Woessner, P.A.

(57) ABSTRACT

Techniques to manage presence information based on routing rules are described. An apparatus may comprise a presence management component operative to manage presence information for a presentity. The presence management component comprises a presence interface module operative to receive a routing rule for a communication event for a presentity node used by a presentity. The presence management component also comprises a presence control module communicatively coupled to the presence interface module, the presence control module operative to determine presence state information based on the routing rule. The presence management component further comprises a presence publish module communicatively coupled to the presence control module, the presence publish module operative to publish the presence state information to multiple watcher nodes. Other embodiments are described and claimed.

12 Claims, 6 Drawing Sheets

(51) Int. Cl.
    *H04J 3/14* (2006.01)
    *H04L 12/721* (2013.01)
    *H04L 12/701* (2013.01)
    *H04L 29/08* (2006.01)

(56) References Cited

U.S. PATENT DOCUMENTS

| | | | |
|---|---|---|---|
| 7,042,998 B2 | 5/2006 | Zino et al. | |
| 7,203,294 B2 * | 4/2007 | Carnazza | H04M 3/42229 379/142.07 |
| 7,224,966 B2 | 5/2007 | Caspi et al. | |
| 7,243,149 B2 | 7/2007 | Kelley et al. | |
| 7,299,259 B2 | 11/2007 | Petrovykh | |
| 8,903,789 B2 * | 12/2014 | Boni | H04W 4/02 455/435.1 |
| 2002/0116461 A1 * | 8/2002 | Diacakis | G06Q 10/087 709/204 |
| 2004/0037396 A1 | 2/2004 | Gray et al. | |
| 2006/0142030 A1 | 6/2006 | Coskun et al. | |
| 2006/0167977 A1 | 7/2006 | Wu et al. | |
| 2006/0190117 A1 * | 8/2006 | Weczorek | H04L 29/06 700/103 |
| 2006/0218399 A1 | 9/2006 | FitzGerald et al. | |
| 2007/0118809 A1 * | 5/2007 | Ozugur | H04L 63/102 715/776 |
| 2007/0150825 A1 | 6/2007 | Jachner | |
| 2007/0150941 A1 | 6/2007 | Jachner | |
| 2007/0189481 A1 | 8/2007 | Cadiz et al. | |
| 2007/0189489 A1 | 8/2007 | Carnazza et al. | |
| 2007/0203748 A1 | 8/2007 | Rothpearl et al. | |
| 2008/0002820 A1 * | 1/2008 | Shtiegman | H04L 29/06027 379/211.02 |

OTHER PUBLICATIONS

"Planning an Exchange 2007 Unified Messaging and Office Communications 2007 Server Deployment", http://technet.microsoft.com/en-us/library/bb676499(EXCHG.80).aspx., 2007, 6 pages (author unknown).

"Cisco Unified Call Connector Mobility", http://www.cisco.com/en/US/prod/collateral/voicesw/ps6789/ps7046/ps7274/p -s7291/product.sub._data.sub._sheet0900aecd805d3568.html. 6 pages.

Kafel, Ali, "Mobile Call Convergence: More Than Just UMA", PTC'06 Proceedings, 2006, 5 pages.

Bertino et al. , "UCS-Router: A Policy Engine for Enforcing Message Routing Rules in a Universal Communication System", Retrieved at <<http://ieeexplore.ieee.org/iel5/7801/21445/00994339.pdf?arnumber=- 994339>>, Proceedings of the Third International Conference on Mobile Data Management, 2002 IEEE, pp. 8.

"Planning an Exchange 2007 Unified Messaging and Office Communications 2007 Server Deployment", Retrieved at http://technet.microsoft.com/en-us/library/bb676499(EXCHG.80).aspx>>-; Aug. 28, 2007, pp. 1-6.

"Cisco Unified CallConnector Mobility", Retrieved at <<http://www.cisco.com/en/US/prod/collateral/voicesw/ps6789/ps70461-ps7274/ps7291/product.sub._--data.sub.--sheet0900aecd805d3568.html>>, Feb. 19, 2008, pp. 1-6.

Kafel, Ali, "Mobile Call Convergence: More than Just UMA", Retrieved at <<http://www.ptc.org/events/ptc06/program/public/proceedings/Ali%20- Kafel.sub.--paper.sub.--t234%20(formatted).pdf>>, PTC'06 Proceedings, pp. 1-5.

* cited by examiner

400

- RECEIVE A ROUTING RULE FOR COMMUNICATION EVENTS FOR A PRESENTITY
  *402*

- DETERMINE PRESENCE STATE INFORMATION BASED ON THE ROUTING RULE
  *404*

- PUBLISH THE PRESENCE STATE INFORMATION TO MULTIPLE WATCHER NODES
  *406*

*FIG. 4*

TECHNIQUES TO MANAGE PRESENCE INFORMATION BASED ON ROUTING RULES

CROSS-REFERENCE TO RELATED APPLICATIONS

The present application is continuation of and claims priority to U.S. patent application Ser. No. 12/142,787, entitled "Techniques to Manage Presence Information Based on Routing Rules" and filed Jun. 20, 2008, the entirety of which is incorporated herein by reference

BACKGROUND

In computer and telecommunications networks, presence information is used to convey ability and willingness of a potential communication partner to communicate. The communication partner typically provides presence state information via a network connection to a presence service. The presence service publishes the presence state information to a set of watchers, who can then determine whether the communication partner is available or willing to open a communication channel. The more accurate or precise the presence state information, the more effective communications becomes between two or more parties. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for a communications network. Some embodiments are particularly directed to techniques to manage presence information for various nodes in a communications network. An apparatus may comprise a presence management component operative to manage presence information for a presentity. The presence management component may comprise, among other elements, a presence interface module operative to receive a routing rule for a communication event for a presentity node used by a presentity. The presence management component also comprises a presence control module communicatively coupled to the presence interface module, the presence control module operative to determine presence state information based on the routing rule. The presence management component further comprises a presence publish module communicatively coupled to the presence control module, the presence publish module operative to publish the presence state information to multiple watcher nodes. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a logic flow.

DETAILED DESCRIPTION

Figure 1:
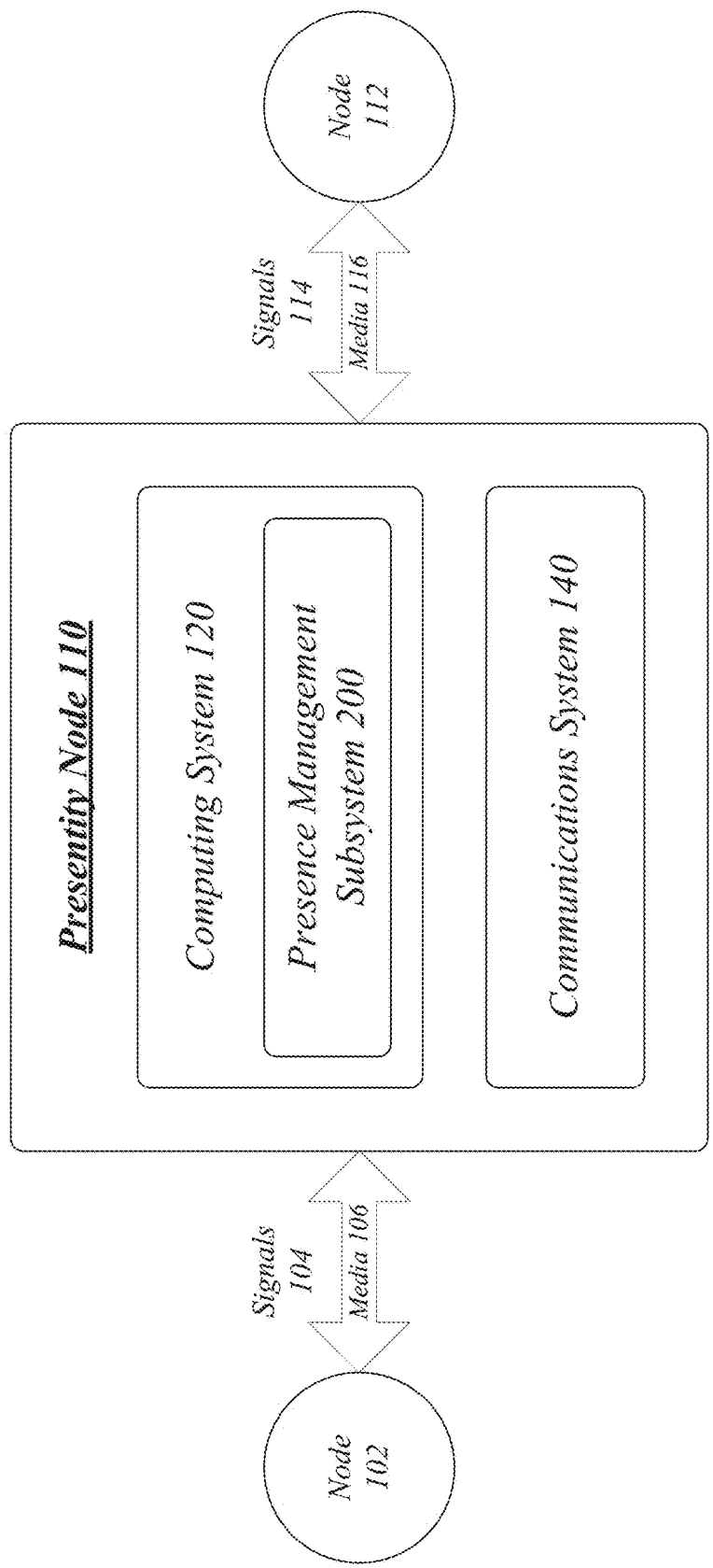
FIG. 1 illustrates an embodiment of a first network.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are directed to enhanced techniques to manage presence information for a presentity based on routing rules for one or more presentity nodes in a communications network. The term "presentity" may refer to an entity described by presence information. The entity may comprise, for example, a human user or operator of an electronic device. A presentity node may refer to an electronic device used by a presentity to convey presence state information to watcher nodes over a network. The watcher nodes display the presence state information for other human users or operators sometimes referred to as watchers. The watchers may then determine whether a presentity is willing and/or able to communicate with another communication partner based on the presence state information.

A presentity node may publish presence state information to indicate its current communication status. This published presence state information informs others that desire to contact the presentity of his/her availability and willingness to communicate. A common use of presence state information is to display an indicator icon on a communication application, such as an instant messaging (IM) client. The indicator icon may comprise a graphic symbol corresponding with an easy-to-convey meaning, and a list of corresponding text descriptions for each of the states. Examples of such text descriptions may include "free for chat," "busy," "away," "do not disturb," "out to lunch" and so forth. Such presence states exist in many variations across different communications clients. Current standards typically support a rich choice of additional presence attributes that can be used for presence information, such as user mood, location, or free text status.

In some cases, however, the presence state information may not accurately represent whether a presentity is willing and able to communicate with a communication partner since they fail to consider the affects of routing rules implemented for one or more presentity nodes used by the presentity, among other design problems. More particularly, the presence state information may be set to presence available state information for a communication event for a presentity node, even though a routing rule prevents the communication event from ever reaching the presentity node. For example, the presence available state information may indicate to a watcher node that a presentity is available to communicate using an office telephone. The presentity may establish a routing rule, however, that forwards all calls to the office telephone to a voicemail service. Consequently, the presence available state information is incorrect since the routing rule effectively makes the presentity unavailable to communicate.

To solve these and other problems, various embodiments may be directed to enhanced techniques to manage presence information for a presentity. Various embodiments may implicitly or explicitly determine presence state information based on routing rules for communications events. In one embodiment, for example, an operator may define one or more routing rules for routing a communications event for a presentity node for a presentity. The presentity node may receive the routing rules, and process the routing rules to determine presence state information for the presentity. Additionally or alternatively, the presentity node may send the routing rules to a presence server for determining presence state information for the presentity. The presentity node and/or the presence server may then publish the update presence state information to one or more watcher nodes. A watcher may use the presence state information provided by an appropriate output device, or combination of output devices, for the watcher node in order to determine whether a presentity is available for communications via a particular communications technique and/or communications device. By using routing rules as a factor in determining presence state information for a presentity, the embodiments provide more precise determinations as to whether a presentity is actually available or unavailable for communications with a watcher. This potentially enhances user experiences for both presentities and watchers.

FIG. 1 illustrates a block diagram for a communications network 100. The communications network 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the communications network 100 may comprise, among other elements, multiple nodes 102, 110 and 112. A node generally may comprise any electronic device designed for managing, processing or communicating information in the communications network 100. Examples for a node may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the communications network 100 as shown in FIG. 1 has a limited number of nodes in a certain topology, it may be appreciated that the communications network 100 may include more or less nodes in alternate topologies as desired for a given implementation.

The nodes 102, 112 may be communicatively coupled to the node 110 via respective communications media 106, 116. The nodes 102, 110, 112 may coordinate operations between each other. The coordination may involve the uni-directional or bi-directional exchange of information. For instance, the nodes 102, 112 may communicate information with the node 110 in the form of respective signals 104, 114 communicated over the respective communications media 106, 116. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the node 110 may be implemented as a presentity node 110, and the nodes 102, 112 may be implemented as respective watcher nodes 102, 112. The presentity node 110 may comprise any logical or physical entity that is arranged to receive, manage, process or communicate presence information with the watcher nodes 102, 112. The watcher nodes 102, 112 may comprise any logical or physical entity that is arranged to receive presence information from the presentity node 110.

The presentity node 110 may comprise a computing system 120 and/or a communications system 140. The computing system 120 includes various common computing elements, such as one or more processors, co-processors, memory units, chipsets, controllers, peripherals, interfaces, oscillators, timing devices, video cards, audio cards, multimedia input/output (I/O) components, and so forth. The communications system 140 includes various common communications elements, such as a transmitter, receiver, transceiver, radio, network interface, baseband processor, antenna, amplifiers, filters, and so forth. In one embodiment, for example, the presentity node 110 may be implemented using a computing and communications architecture as described with reference to FIG. 5.

The computing system 120 and/or the communications system 140 may include a presence management subsystem 200. The presence management subsystem 200 may implement various enhanced techniques to manage presence information for the presentity node 110 in the communications network 100. The presence management subsystem 200 may receive notification of various events related to the presentity node 110, generate presence information for the presentity node 110 in accordance with the input events, and send the generated presence information to a presence server to publish the presence information to one or more watcher nodes 102, 112. In some cases, the presentity node 110 may send the presence information directly to the watcher nodes 102, 112, thereby reducing or eliminating the need for the presence server.

Additionally or alternatively, the presence management subsystem 200 may be implemented as part of the presence server rather than the presentity node 110. This may allow modifications to the hardware and/or software for only the presence server, thereby reducing or eliminating any modifications needed for the presentity node 110. This may be advantageous, for example, when the enhanced presence techniques are implemented for a communications system with a larger number of legacy devices as the presentity nodes.

The presence management subsystem 200 may implement various enhanced techniques to manage presence information for a presentity. Various embodiments may implicitly or explicitly determine presence state information based on routing rules for communications events. In one embodiment, for example, the presentity node 110 for a presentity may send routing rules to a presence server. The routing rules may include routing communications events to different devices for an entity, different entities, messaging services, and so forth. Additionally or alternatively, the routing rules may include various routing conditions for routing a communications event, such as presence temporal conditions, calling entity conditions, and so forth. The presence server may receive the routing rules, and process the routing rules to determine presence state information for the presentity. The presence state information may indicate, for example, whether the presentity is actually available or unavailable to receive a communications event, among other presence states. The presence server may then publish the update presence state information to one or more watcher nodes 102, 112.

The watcher nodes 102, 112 may receive the updated presence state information, and use an output device to convey the presence state information to the watcher. Examples for the output device for the watcher nodes 102, 112 may support various notification modalities, such as a display device to provide visual indicators, an auditory device such as a speaker to provide audio indicators, a vibrating device to provide tactile indicators, and so forth. The notification modalities may include a present state for the presentity, as well as a communications technique by which the presentity might be available for communication. Examples of the communications techniques may include without limitation telephony communications, instant messaging communications, email communications, chat message communications, group message communications, and so forth. Further, the notification modalities may include contact information and communications devices suitable for communicating with the presentity, such as an office telephone, a home telephone, a mobile telephone, and so forth. A watcher may use the presence state information provided by the appropriate output device, or combination of output devices, for the watcher node 102 or 112 in order to determine whether a presentity is available for communications via a particular communications technique and/or communications device. By using routing rules as a factor in determining presence state information for a presentity, the embodiments provide more precise determinations as to whether a presentity is actually available or unavailable for communications with a watcher. Additional details for the presence management subsystem 200 may be described with reference to FIG. 2.

Figure 2:
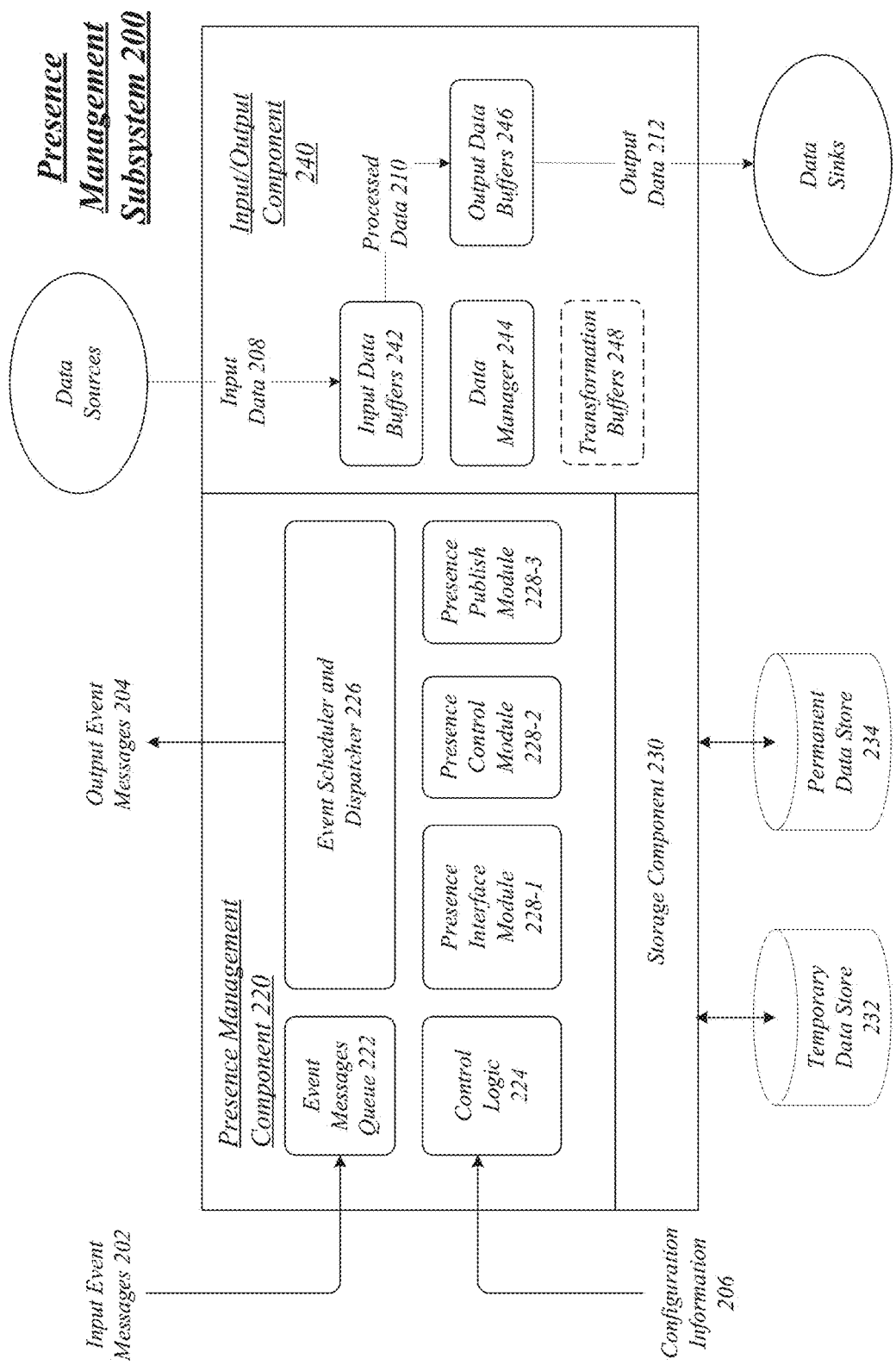
FIG. 2 illustrates an embodiment of a presence management subsystem.

FIG. 2 illustrates an embodiment of the presence management subsystem 200. The presence management subsystem 200 may comprise multiple components and/or modules. In the illustrated embodiment shown in FIG. 2, the presence management subsystem 200 may include a presence management component 220, a storage component 230, and an input/output (I/O) component 240. The components and/or modules may be implemented using hardware elements, software elements, or a combination of hardware elements and software elements. Although the presence management subsystem 200 as shown in FIG. 2 has a limited number of elements in a certain topology, it may be appreciated that the presence management subsystem 200 may include more or less elements in alternate topologies as desired for a given implementation.

A presence management component 220 may be arranged to receive various input event messages 202 at an event message queue 222. The event message queue 222 may comprise one or more queues for handling event messages. In one embodiment, for example, the event message queue 222 may handle event messages with distinct priorities. Examples of input event messages 202 may include without limitation control directives to create or modify routing rules, routing rule information, routing rule updates, requests for presence information, notification of incoming communications events or requests, updated time zone information as the presentity node 110 moves between different geographic locations, updated network information as the presentity node 110 moves between networks, updated location information from an external location source (e.g., base station triangulation), and other input events relevant to the operations of the presentity node 110.

The presence management component 220 may include control logic 224. The control logic 224 may be arranged to control operations of the presence management component 220 based on configuration information 206. For example, the control logic 224 may execute an algorithm, logic flow or a state machine to perform various operations on the input data 208 in response to the various input event messages 202. The control logic 224 may process the input data 208 based on the configuration information 206 to form processed data 210. The control logic 224 may also generate various output event messages 204, and send the output event messages 204 to an event scheduler and dispatcher 226.

The presence management component 220 may include an event scheduler and dispatcher 226. The event scheduler and dispatcher 226 may be arranged to initiate events to other external entities, and dispatches internal events and messages within the presence management component 220. For example, the event scheduler and dispatcher 226 to send various output event messages 204 responsive to the input event messages 202 to other systems, subsystems, components or modules for the systems 120, 140, the presentity node 110, and/or the communications network 100. Examples of output event messages 204 may include without limitation publishing various types of presence information such as presence definition information and presence state information, location information, control directives to the communications system 140 to route incoming communications requests, sending routing rule information or routing rule updates to the presence server, and so forth.

In one embodiment, the presence management subsystem 200 may include the storage component 230. The storage component 230 may be arranged with data stores and logic to manage storage operations for the presence management component 220. The storage component 230 may store temporary or non-transacted information used by the presence management component 220 in a temporary data store 232. For example, the temporary or non-transacted information may be stored as extensible markup language (XML), binary files, or some other format in the temporary data store 232. The storage component 230 may store persistent or transacted information used by the presence management component 220 in a permanent data store 234. The data stores 232, 234 may comprise individual data stores, respectively, or multiple data stores comprising part of a larger data store array, such as a storage area network (SAN). Furthermore, the storage component 230 and the data stores 232, 234 may implement the appropriate data buffering and caching techniques and structures if needed to meet system latency and capacity parameters. The storage component 230 also manages operations for logging and auditing storage.

In one embodiment, the presence management subsystem 200 may include the I/O component 240. The I/O component 240 may be arranged with buffers and logic to manage transport and I/O operations in moving information throughout the presence management subsystem 200. For example, the I/O component 240 may include one or more input data buffers 242 to receive and store input data 208 from an input subsystem. One or more modules of the presence management component 220 may process the input data 208 to form processed data 210, and send it to one or more output data buffers 246. The output data buffers 246 may be arranged to store and send output data 212 to an output subsystem. A data manager 244 may implement logic and network interfaces (e.g., web service interfaces) to control and manage data collection services and data distribution services. Optionally, the I/O component 240 may implement one or more transformation buffers 248 to transform the input data 208 and/or the processed data 210 from one format, data schema or protocol, to alternate formats, data schemas, or protocols.

In general operation, the presence management subsystem 200 may be arranged to implement various enhanced presence information management techniques. In particular, the presence management component 220 of the presence management subsystem 200 may be operative to manage presence information for a presentity, one or more presentity nodes (e.g., the presentity node 110), a presence server, watcher nodes 102, 112, or other electronic devices comprising part of the communications network 100. This may be accomplished using a number of presence modules 228-1-$p$. In the illustrated embodiment shown in FIG. 2, the modules 228-1-$p$ may include a presence interface module 228-1, a presence control module 228-2, and a presence publish module 228-3. Although a specific number of presence modules 228-1-$p$ are shown in FIG. 2 by way of example and not limitation, it may be appreciated that more or less modules may be implemented for various sets of presence management operations as desired for a given implementation. The embodiments are not limited in this context.

The presence interface module 228-1 may be generally arranged to manage interface operations for receiving input information and providing output information. The type and structure of the presence interface module 228-1 may vary in accordance with whether the presence management subsystem 200 is implemented for the presentity node 110, a presence server, or in both devices.

When implemented as part of the presentity node 110, for example, the presence interface module 228-1 may receive control directives from a user to create or modify routing rules. In this case, the presence interface module 228-1 may illustrate various graphic user interface (GUI) views to establish a dialog with an operator or user, such as providing GUI command menus, buttons and other GUI interface tools. Similarly, the presence interface module 228-1 may send or relay the control directives to various elements of the presentity node 110 for handling, such as a communications interface to implement a routing rule. The presence interface module 228-1 may also send or relay the routing rules to another network device, such as a presence server.

When implemented as part of a presence server, for example, the presence interface module 228-1 may receive routing rule information or routing rule updates from the presentity node 110. In this case, the presence interface module 228-1 may perform error check operations, data schema transforms, and other data interface operations to prepare the routing rule information for processing into presence state information for the presentity and/or the presentity node 110 used by the presentity. The presence interface module 228-1 may forward the processed routing rule information to the presence control module 228-2 for presence determination operations.

The presence control module 228-2 may be communicatively coupled to the presence interface module 228-1. The presence control module 228-2 may be generally arranged to perform presence determination operations to implicitly or explicitly determine whether a presentity is available or unavailable for communications, and generate presence state information accordingly. In one embodiment, the presence control module 228-2 is operative to determine presence state information based on the routing rule information received directly or indirectly (via the presentity node 110) from an operator. The routing rules may comprise any type of routing rules that route communication events from one device to another device. The routing rules may comprise one or more routing parameters or conditions, thereby providing potentially multiple routing possibilities for a communications event. Each routing possibility is evaluated and mapped to a presence state. The mapping may be stored by a table or list by the storage component 230. It may be appreciated that the routing rules may comprise any number of routing parameters or conditions thereby providing arbitrary levels of complexity, as long as each routing possibility is mapped to an appropriate presence state. It may be further appreciated that although examples of routing rules and routing conditions are provided by way of example below, the embodiments are not limited to these examples.

The presence control module 228-1 evaluates a routing rule for routing a communications event typically received by the presentity node 110 to another device owned by the presentity, another device owned by an entity other than the presentity, a third-party device owned by a communications service provider, or some other device or entity. The presence control module 228-1 determines whether the routing rule effectively modifies the presence state for the presentity. If so, the presence control module 228-1 modifies the presence state information for the presentity, and outputs the modified presence state information to the presence publish module 228-3. If not, the presence control module 228-1 leaves the current presence state information unchanged.

In one embodiment, the presence control module 228-2 is operative to determine presence available state information when a routing rule routes communication events for a presentity contact number for the presentity node 110 to another presentity contact number for another presentity node used by the presentity. By way of example, assume a presentity owns multiple presentity nodes 110, including an office telephone with a first presentity contact number and a mobile telephone with a second presentity contact number. In this case, the presentity contact numbers may each comprise standard 10 digit telephone numbers. Further assume the presentity defines a routing rule to route all telephone calls directed to the office telephone with the first telephone number to the mobile telephone with the second telephone number. In this case, the presence control module 228-2 may determine that even though there is a routing rule in place, the presentity is still available since the routing rule merely routes the incoming telephone calls to a different device owned by the presentity. Consequently, the presence state information for the presentity is set (or remains) as presence available state information.

In one embodiment, the presence control module 228-2 is operative to determine presence unavailable state information when the routing rule routes communication events for the presentity contact number to another contact number for another entity. Continuing with our previous example, assume the presentity defines a routing rule to route all telephone calls directed to the office telephone to an office telephone for a colleague, such as an office assistant. In this case, the presence control module 228-2 may determine that the routing rule makes the presentity unavailable despite that a telephone call to the office telephone for the presentity will be answered by a human operator. Consequently, the presence state information for the presentity is set (or remains) as presence unavailable state information.

In one embodiment, the presence control module 228-2 is operative to determine presence unavailable state information when the routing rule routes communication events for a presentity contact number for the presentity node 110 to a message service, such as natively provided by the presentity node 110 or through a third-party service provider. Continuing with our previous example, assume the presentity defines a routing rule to route all incoming telephone calls to the office telephone to a voicemail service. In this case, the presence control module 228-2 may determine that the routing rule makes the presentity unavailable despite that a telephone call to the office telephone will be answered by an automated attendant. Consequently, the presence state information for the presentity is set (or remains) as presence unavailable state information.

In one embodiment, the presence control module 228-2 is operative to determine presence state information for a presentity and/or the presentity node 110 based on a routing condition for a routing rule. A routing rule may include any number of different routing conditions to trigger where or when a communications event is routed. Examples of routing conditions may include a date, a time, a caller, a priority level, a geographic location, a time zone, a power level, a sending device, a receiving device, and so forth. For example, various embodiments route by presence temporal conditions or calling entity conditions, although other routing conditions may be implemented as well. The presence control module 228-2 is operative to determine presence available state information when the routing rule routes communication events for the presentity node when a routing condition is matched, and presence unavailable state information when the routing rule routes communication events for the presentity node when the routing condition is unmatched.

In one embodiment, a routing rule may include routing instructions to route a communications event based on a presence temporal condition. A presence temporal condition may comprise a routing condition dependent upon presence temporal information. Presence temporal information may comprise any type of presence information that has a time attribute associated with the presence information. For example, the presence temporal information may include a date and/or time for when a presentity is available or unavailable to communicate. This may be useful when defining an amount of time a presentity might be available or unavailable to communicate. For example, a presentity may provide presence temporal information in the form of business hours and personal hours. The business hours may refer to the dates and/or times when the presentity is available for business matters. The personal hours may refer to the dates and/or times when the presentity is available for personal matters, or stated another way, when the presentity is not available for business matters. In this manner, a presentity may maintain a desired work/life balance.

In addition to business hours and personal hours, the presentity temporal information may be defined in terms of a home time zone and a local time zone. A time zone may refer to a region of the earth that has adopted the same standard time. Most adjacent time zones are exactly one hour apart, and by convention compute their local time as an offset from Coordinated Universal Time (UTC). A home time zone may represent a primary time zone for a location where an operator is typically present, such as a primary residence or office. For example, when a presentity enters his/her business hours into a calendar application program for the primary residence or office, the business hours are defined in terms of a time zone, such as Greenwich Mean Time (GMT), Eastern Standard Time (EST), Mountain Standard Time (MST), Pacific Standard Time (PST), and so forth. A local time zone may represent a secondary time zone for a location where the operator is currently located at any given moment in time, and is typically somewhere other than the location for the home time zone. For example, a presentity may enter a local time zone when traveling with a mobile device.

In one embodiment, a routing rule may include routing instructions to route a communications event based on a presence temporal condition. For example, a presentity may define a routing rule to route a communications event to a mobile telephone during business hours, and voicemail during personal hours. In this case, the presence control module 228-2 may receive clock information, and determine presence available state information when the clock information indicates business hours, and presence unavailable state information when the clock information indicates personal hours. When the presentity is traveling, the presence control module 228-2 may receive clock information and normalize for a time zone where the mobile telephone is currently located, and determine the presence state information accordingly.

In one embodiment, a routing rule may include routing instructions to route a communications event based on a calling entity condition. A calling entity condition may comprise a routing condition dependent on a calling entity. For example, assume a presentity defines a routing rule to route a communications event based on a calling entity as identified using a caller identification technique. The presence control module 228-2 may receive the routing rule, determine that the presentity is only available for a limited number of callers, and determine that the presentity is unavailable for incoming telephone calls. In some cases, the presence control module 228-2 may provide a finer level of distinction, and determine that the presentity is available for a certain set of callers and unavailable for all other callers (or vice-versa). The presence control module 228-2 may then output the appropriate presence state information to the presence publish module 228-3, to publish the appropriate presence state information to the corresponding sets of callers.

The presence publish module 228-3 may be communicatively coupled to the presence control module 228-2. The presence publish module 228-3 may be generally arranged to receive presence state information from the presence control module 228-2, and publish presence state information for a presentity to other entities interested in the presence of a presentity, such as the watcher nodes 102, 112. For example, the presence publish module 228-3 is operative to publish presence available state information or presence unavailable state information to the multiple watcher nodes 102, 112. When the presence management subsystem 200 is implemented as part of the presentity node 110, the presence publish module 228-3 may publish the presence state information to the watcher nodes 102, 112 via publishing capabilities provided by a presence server. When the presence management subsystem 200 is implemented as part of a presence server, the presence publish module 228-3 may utilize its native publishing capabilities.

Figure 3:
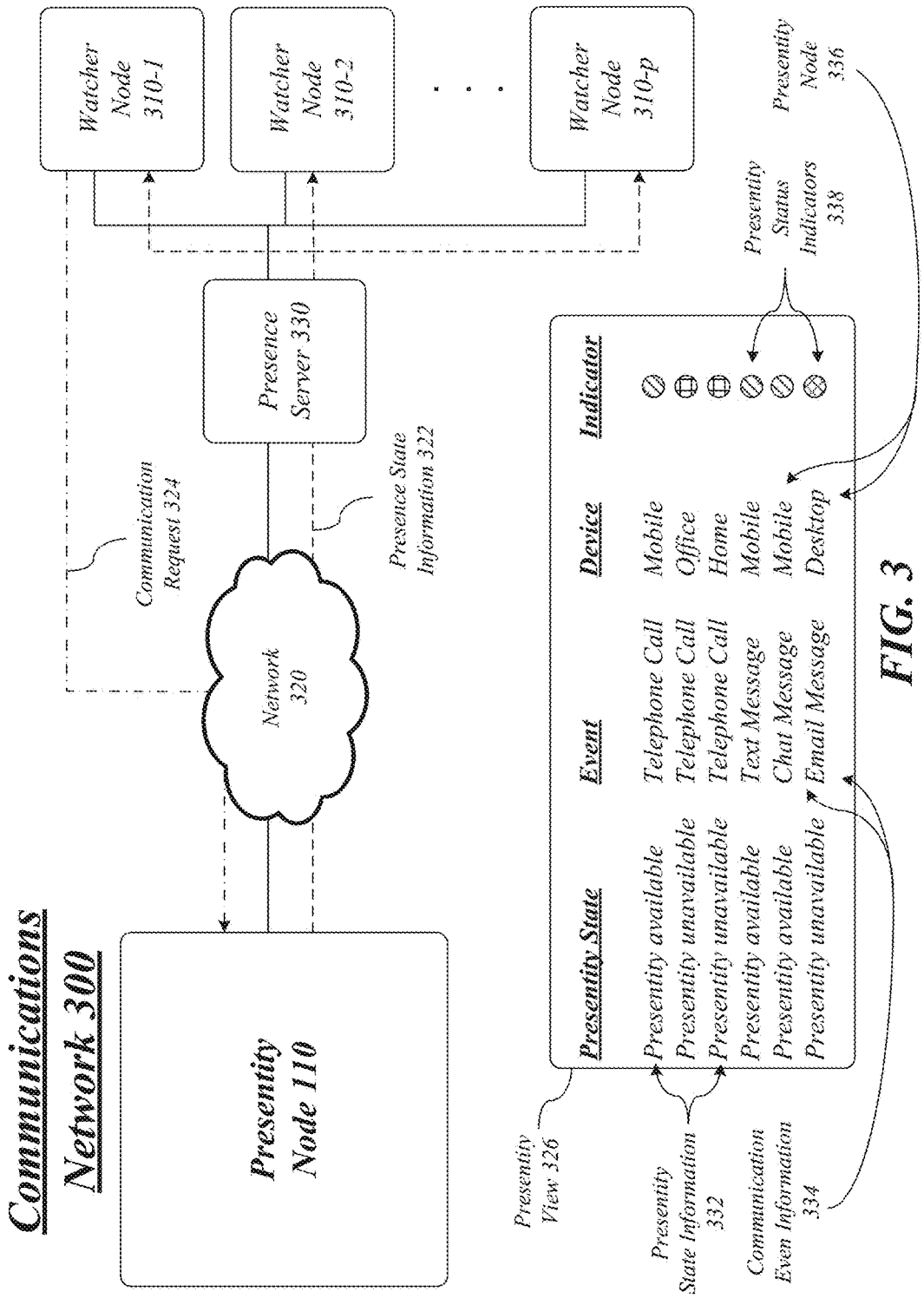
FIG. 3 illustrates an embodiment of a second network.

FIG. 3 illustrates a block diagram for a communications network 300. The communications network 300 is similar to the communications network 100, with some additional nodes. In the illustrated embodiment shown in FIG. 3, the presentity node 110 may communicate with a presence server 330 and one or more watcher nodes 310-1-*p*. The watcher nodes 310-1-*p* may be representative of, for example, the watcher nodes 102, 112 as described with reference to FIG. 1.

Referring again to the presence management component 220, the presence control module 228-2 may determine presence state information for a presentity based on a routing rule established for the presentity node 110. The presence publish module 228-3 may receive the presence state information, and publish the presence state information to the watcher nodes 310-1-*p* via the presence server 330 and the network 320. The presence state information 322 may represent any number of defined presence states for a presentity. In a basic form, the presence state information 322 may include presence available state information and presence unavailable state information.

The watcher nodes 310-1-*p* may receive the published presence state information, and output the published presence state information to a watcher using one or more output devices implemented for the watcher nodes 310-1-*p*. Examples for the output device for the watcher nodes 102, 112 may support various notification modalities, such as a display device to provide visual indicators, an auditory device such as a speaker to provide audio indicators, a vibrating device to provide tactile indicators, and so forth. The notification modalities may include a present state for the presentity, as well as a communications technique by which the presentity might be available for communication. Examples of the communications techniques may include without limitation telephony communications, instant messaging communications, email communications, chat message communications, group message communications, and so forth. Further, the notification modalities may include contact information and communications devices suitable for communicating with the presentity, such as an office telephone, a home telephone, a mobile telephone, a one-way pager, a two-way pager, a network appliance, a web-enabled device, and so forth. A watcher may use the presence state information provided by the appropriate output device, or combination of output devices, for the watcher node 102 or 112 in order to determine whether a presentity is available for communications via a particular communications technique and/or communications device.

In one embodiment, for example, a watcher node 310-1-*p* may generate and display a presentity view 326. The presentity view 326 may comprise various GUI elements to convey presence state information for a watcher. In the illustrated embodiment shown in FIG. 3, the presentity view 326 displays the presentity state information 332, corresponding communication event information 334, a corresponding presentity node 336, and a corresponding presentity status indicator 338. The presentity state information 332 may comprise, for example, presence available state information or presence unavailable state information. The communication event information 334 may represent various communication events, such as telephone calls, text messages, chat messages, email messages, voicemail messages, and so forth. The presentity node 336 may comprise any type of electronic communications device owned by a presentity, such as a mobile telephone, an office telephone, a home telephone, a desktop computer, a laptop computer, and so forth. The presentity status indicator 338 may comprise visual indicators capable of displaying different colors to represent different presence states for the presentity. For example, the color green may indicate the presentity is available, the color yellow may indicate the presentity is temporarily unavailable, the color red may indicate the presentity is unavailable, and so forth. Through the various types of visual information provided by the presentity view 326, a watcher may quickly determine whether a presentity is available for communication by a given communication technique and communications device. A watcher may then use the watcher node 310-1-*p* to initiate a communication event with the presentity by sending a communications request 324 to the presentity node 110 via the network 320.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may receive a routing rule for communication events for a presentity node used by a presentity at block 402. For example, the presence interface module 228-1 of the presence management component 220 of the presence management subsystem 200 may receive a routing rule for communication events for the presentity node 110 used by a presentity. The routing rule may route a communication event typically received by the presentity node 110 to another device owned by the presentity, another device owned by an entity other than the presentity, a third-party device owned by a communications service provider, or some other device or entity. The presence interface module 228-1 may output the routing rule to the presence control module 228-2.

The logic flow 400 may determine presence state information based on the routing rule at block 404. For example, the presence control module 228-2 may receive the routing rule from the presence interface module 228-1, and determine presence state information based on the routing rule. For example, the presence control module 228-2 may determine presence available state information when the routing rule routes a communication event typically received by the presentity node 110 to another device owned by the presentity. In another example, the presence control module 228-2 may determine presence unavailable state information when the routing rule routes a communication event typically received by the presentity node 110 to another device owned by an entity other than the presentity, such as an assistant. In yet another example, the presence control module 228-2 may determine presence unavailable state information when the routing rule routes a communication event typically received by the presentity node 110 to a message service, such as voicemail services offered natively by the presentity node 110 or through a third-party device owned by a communications service provider. The presence control module 228-2 may output the presence state information to the presence publish module 228-3.

The logic flow 400 may publish the presence state information to multiple watcher nodes at block 406. For example, the presence publish module 228-3 may receive the presence state information from the presence control module 228-2, and publish the presence state information to multiple watcher nodes 310-1-$p$. The watcher nodes 310-1-$p$ may then present the presence state information to corresponding watchers through various notification modalities, including a visual modality via the presentity view 326.

Figure 5:
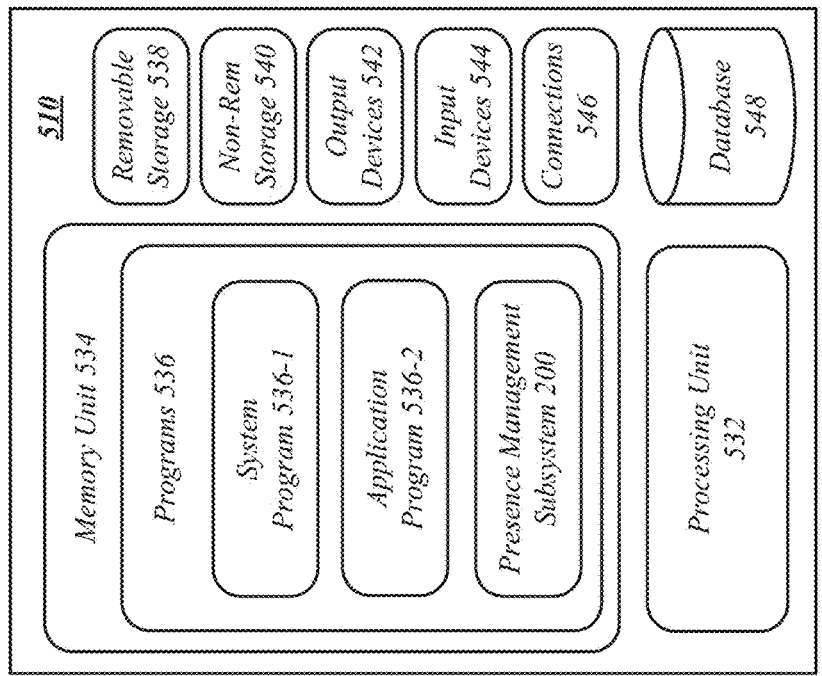
FIG. 5 illustrates an embodiment of a computing architecture.

FIG. 5 further illustrates a more detailed block diagram of computing architecture 510 suitable for implementing the presentity node 110, the presence server 330, and/or the watcher nodes 310-1-$p$. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more software programs 536-1-$t$ and accompanying data. Depending on the implementation, examples of software programs 536-1-$t$ may include a system program 536-1 (e.g., an operating system), an application program 536-2 (e.g., a calendar application), the presence management subsystem 200, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-$v$. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
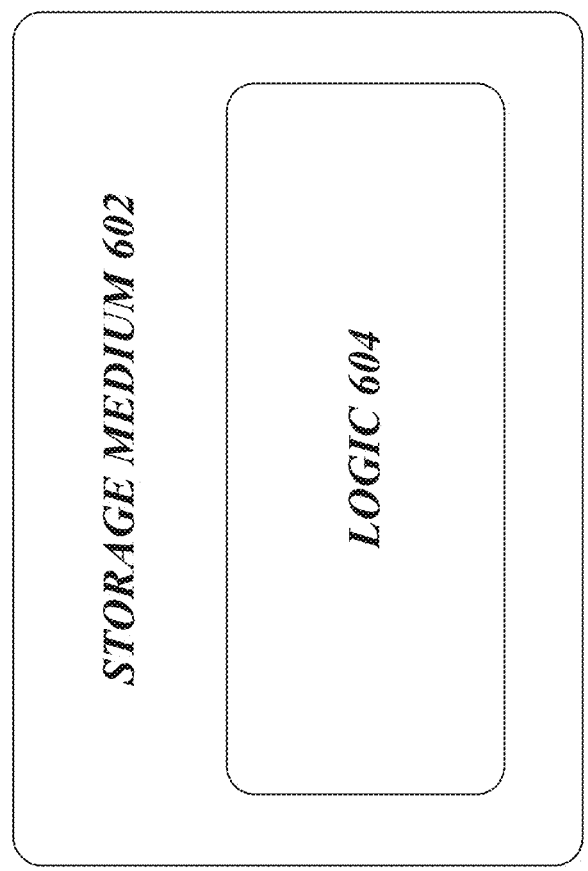
FIG. 6 illustrates an embodiment of an article.

FIG. 6 illustrates a diagram an article of manufacture 600 suitable for storing logic for the various embodiments. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A communication device, comprising:
a processor coupled to at least one memory; and
logic operative on the processor to process presence available state information stored in the at least one memory, the presence available state information corresponds to another communication device and is incorrect in view of routing rule information and presence information published by the other communication device, and process at least one notification operative to correct the presence available state information to indicate unavailability of the other communication device for communications.

2. The communication device of claim 1, wherein the at least one notification indicating a presence state for the other communication device and at least one communications technique by which the other communication device is available for communication.

3. The communication device of claim 1, wherein the at least one notification comprising presence state unavailable information.

4. The communication device of claim 1, wherein the presence information is not accurate based upon a routing rule comprising a condition, that when met, causes a communication event sent to the other communication device to be routed to a different device.

5. The communication device of claim 1, wherein the logic further operative to determine whether the other communication device is available for communication by a communication technique.

6. The communication device of claim 1 further comprising an output device operative to output the at least one notification via at least one modality, the at least one modality comprising at least one of an auditory device, a vibrating device or a display device.

7. The communication device of claim 1, the logic further operative to generate presentity status indicators comprising visual indicators to display different colors to represent different presence states for the other communication device.

8. The communication device of claim 1, the logic further operative to complete a communication event with the presentity node for an electronic device requesting the communication event.

9. A method, comprising:
processing presence available state information that corresponds to a communication device and is incorrect in view of inaccurate presence information published by the communication device, and
process at least one routing condition for the communication device to correct the presence available state information by indicating unavailability of the communication device and indicating availability of another communication device, the at least one routing condition preventing communication events from reaching the communication device, the at least one routing condition comprising a presence temporal condition or a calling entity condition.

10. The method of claim 9 further comprising determining that presence information for the communication device is not accurate based upon a routing rule comprising a condition, that when met, causes a communication event sent to the other communication device to be routed to a different device.

11. The method of claim 9 further comprising determining whether the communication device is available for communications and if so, initiating a communication event between the communication device and another communication device by sending a communications request to the communication device.

12. The method of claim 9 further comprising correcting the presence available state information to indicate unavailability for at least one calling entity and availability for at least one other calling entity.

* * * * *